(12) United States Patent
Wedding et al.

(10) Patent No.: US 8,106,586 B1
(45) Date of Patent: Jan. 31, 2012

(54) PLASMA DISCHARGE DISPLAY WITH FLUORESCENT CONVERSION MATERIAL

(75) Inventors: Carol Ann Wedding, Toledo, OH (US); Oliver M. Strbik, III, Holland, OH (US); Edwin F. Peters, Toledo, OH (US); Thomas J. Pavliscak, Palo Verdes, CA (US)

(73) Assignee: Imaging Systems Technology, Inc., Toledo, OH (US)

( * ) Notice: Subject to any disclaimer, the term of this patent is extended or adjusted under 35 U.S.C. 154(b) by 838 days.

(21) Appl. No.: 12/131,053

(22) Filed: May 31, 2008

Related U.S. Application Data

(63) Continuation-in-part of application No. 11/107,964, filed on Apr. 18, 2005, now Pat. No. 7,405,516.

(60) Provisional application No. 60/564,942, filed on Apr. 26, 2004.

(51) Int. Cl.
*H01J 17/49* (2006.01)

(52) U.S. Cl. ........................... 313/582; 313/486

(58) Field of Classification Search .................. None
See application file for complete search history.

(56) References Cited

U.S. PATENT DOCUMENTS

| | | | |
|---|---|---|---|
| 2,187,432 A | 1/1940 | Powers |
| 2,644,113 A | 6/1953 | Etzkorn |
| 3,050,654 A | 8/1962 | Toulon |
| 3,264,073 A | 8/1966 | Schmitt et al. |
| 3,365,315 A | 1/1968 | Beck et al. |
| 3,602,754 A | 8/1971 | Pfaender et al. |
| 3,607,169 A | 9/1971 | Cox |
| 3,623,907 A | 11/1971 | Watts |
| 3,634,614 A | 1/1972 | Geusic et al. |
| 3,646,384 A | 2/1972 | Lay |
| 3,652,891 A | 3/1972 | Janning |
| 3,654,680 A | 4/1972 | Bode et al. |
| 3,666,981 A | 5/1972 | Lay |
| 3,674,461 A | 7/1972 | Farnand et al. |
| 3,699,050 A | 10/1972 | Henderson |
| 3,793,041 A | 2/1974 | Sowman |
| 3,811,061 A | 5/1974 | Nakayama et al. |
| 3,838,307 A | 9/1974 | Masi |
| 3,838,998 A | 10/1974 | Matthews et al. |
| 3,848,248 A | 11/1974 | MacIntyre |
| 3,860,846 A | 1/1975 | Mayer |
| 3,885,195 A | 5/1975 | Amano |
| 3,916,584 A | 11/1975 | Howard et al. |
| 3,927,342 A | 12/1975 | Bode et al. |
| 3,935,494 A | 1/1976 | Dick et al. |
| 3,964,050 A | 6/1976 | Mayer |
| 3,969,718 A | 7/1976 | Strom |
| 3,975,194 A | 8/1976 | Farnand et al. |
| 3,990,068 A | 11/1976 | Mayer et al. |
| 3,998,618 A | 12/1976 | Kreick et al. |
| 4,027,188 A | 5/1977 | Bergman |
| 4,035,690 A | 7/1977 | Roeber |
| 4,038,577 A | 7/1977 | Bode et al. |
| 4,075,025 A | 2/1978 | Rostoker |
| 4,106,009 A | 8/1978 | Dick |
| 4,119,422 A | 10/1978 | Rostoker |

(Continued)

*Primary Examiner* — Ashok Patel
(74) *Attorney, Agent, or Firm* — Donald K. Wedding

(57) ABSTRACT

An AC or DC PDP containing a fluorescent conversion material (FCM) that produces IR when excited by a gas discharge. In one embodiment, the fluorescent conversion material is rare earth doped chalcogenide. The PDP may comprise a multiplicity of plasma-sells or plasma-tubes on a substrate, each plasma-shell or plasma-tube containing FCM.

8 Claims, 10 Drawing Sheets

U.S. PATENT DOCUMENTS

| | | | |
|---|---|---|---|
| 4,126,807 | A | 11/1978 | Wedding et al. |
| 4,126,809 | A | 11/1978 | Wedding et al. |
| 4,133,854 | A | 1/1979 | Hendricks |
| 4,163,637 | A | 8/1979 | Hendricks |
| 4,164,678 | A | 8/1979 | Biazzo et al. |
| 4,166,147 | A | 8/1979 | Lange et al. |
| 4,257,798 | A | 3/1981 | Hendricks et al. |
| 4,279,632 | A | 7/1981 | Frosch et al. |
| 4,290,847 | A | 9/1981 | Johnson et al. |
| 4,303,061 | A | 12/1981 | Torobin |
| 4,303,431 | A | 12/1981 | Torobin |
| 4,303,432 | A | 12/1981 | Torobin |
| 4,303,433 | A | 12/1981 | Torobin |
| 4,303,603 | A | 12/1981 | Torobin |
| 4,303,729 | A | 12/1981 | Torobin |
| 4,303,730 | A | 12/1981 | Torobin |
| 4,303,731 | A | 12/1981 | Torobin |
| 4,303,732 | A | 12/1981 | Torobin |
| 4,303,736 | A | 12/1981 | Torobin |
| 4,307,051 | A | 12/1981 | Sargeant et al. |
| 4,314,827 | A | 2/1982 | Leitheiser et al. |
| 4,322,378 | A | 3/1982 | Hendricks |
| 4,344,787 | A | 8/1982 | Beggs et al. |
| 4,349,456 | A | 9/1982 | Sowman |
| 4,363,646 | A | 12/1982 | Torobin |
| 4,391,646 | A | 7/1983 | Howell |
| 4,392,988 | A | 7/1983 | Dobson et al. |
| 4,415,512 | A | 11/1983 | Torobin |
| 4,459,145 | A | 7/1984 | Elsholz |
| 4,494,038 | A | 1/1985 | Wedding et al. |
| 4,525,314 | A | 6/1985 | Torobin |
| 4,542,066 | A | 9/1985 | Delzant |
| 4,547,233 | A | 10/1985 | Delzant |
| 4,548,196 | A | 10/1985 | Torobin |
| 4,548,767 | A | 10/1985 | Hendricks |
| 4,568,389 | A | 2/1986 | Torobin |
| 4,582,534 | A | 4/1986 | Torobin |
| 4,596,681 | A | 6/1986 | Grossman et al. |
| 4,618,525 | A | 10/1986 | Chamberlain et al. |
| 4,637,990 | A | 1/1987 | Torobin |
| 4,638,218 | A | 1/1987 | Shinoda et al. |
| 4,671,909 | A | 6/1987 | Torobin |
| 4,713,300 | A | 12/1987 | Sowman et al. |
| 4,737,687 | A | 4/1988 | Shinoda et al. |
| 4,743,511 | A | 5/1988 | Sowman et al. |
| 4,743,545 | A | 5/1988 | Torobin |
| 4,757,036 | A | 7/1988 | Kaar et al. |
| 4,777,154 | A | 10/1988 | Torobin |
| 4,778,502 | A | 10/1988 | Garnier et al. |
| 4,793,980 | A | 12/1988 | Torobin |
| 4,797,378 | A | 1/1989 | Sowman |
| 4,800,180 | A | 1/1989 | McAllister et al. |
| 4,865,875 | A | 9/1989 | Kellerman |
| 4,879,321 | A | 11/1989 | Laroche |
| 4,883,779 | A | 11/1989 | McAllister et al. |
| 4,963,792 | A | 10/1990 | Parker |
| 5,017,316 | A | 5/1991 | Sowman |
| 5,053,436 | A | 10/1991 | Delgado |
| 5,069,702 | A | 12/1991 | Block et al. |
| 5,077,241 | A | 12/1991 | Moh et al. |
| 5,166,948 | A | 11/1992 | Gavrilovic et al. |
| 5,185,299 | A | 2/1993 | Wood et al. |
| 5,212,143 | A | 5/1993 | Torobin |
| 5,225,123 | A | 7/1993 | Torobin |
| 5,326,298 | A | 7/1994 | Hotomi |
| 5,541,012 | A | 7/1996 | Ohwaki et al. |
| 5,629,953 | A | 5/1997 | Bishop et al. |
| 5,793,158 | A | 8/1998 | Wedding |
| 5,984,747 | A | 11/1999 | Bhagavatula et al. |
| 6,028,977 | A | 2/2000 | Newsome |
| 6,255,777 | B1 | 7/2001 | Kim et al. |
| 6,265,825 | B1 | 7/2001 | Asano |
| 6,368,708 | B1 | 4/2002 | Brown et al. |
| 6,504,645 | B1 | 1/2003 | Lenz et al. |
| 6,534,916 | B1 | 3/2003 | Iato et al. |
| 6,545,422 | B1 | 4/2003 | George et al. |
| 6,570,335 | B1 | 5/2003 | George et al. |
| 6,612,889 | B1 | 9/2003 | Green et al. |
| 6,620,012 | B1 | 9/2003 | Johnson et al. |
| 6,624,414 | B1 | 9/2003 | Glesener |
| 6,633,117 | B2 | 10/2003 | Shinoda et al. |
| 6,646,388 | B2 | 11/2003 | George et al. |
| 6,650,055 | B2 | 11/2003 | Ishimoto et al. |
| 6,677,704 | B2 | 1/2004 | Ishimoto et al. |
| 6,726,992 | B1 | 4/2004 | Yadav et al. |
| 6,762,566 | B1 | 7/2004 | George et al. |
| 6,764,367 | B2 | 7/2004 | Green et al. |
| 6,765,220 | B2 | 7/2004 | Kongable et al. |
| 6,791,264 | B2 | 9/2004 | Green et al. |
| 6,794,812 | B2 | 9/2004 | Yamada et al. |
| 6,796,867 | B2 | 9/2004 | George et al. |
| 6,801,001 | B2 | 10/2004 | Drobot et al. |
| 6,822,626 | B2 | 11/2004 | George et al. |
| 6,836,063 | B2 | 12/2004 | Ishimoto et al. |
| 6,836,064 | B2 | 12/2004 | Yamada et al. |
| 6,841,929 | B2 | 1/2005 | Ishimoto et al. |
| 6,857,923 | B2 | 2/2005 | Yamada et al. |
| 6,864,631 | B1 | 3/2005 | Wedding |
| 6,893,677 | B2 | 5/2005 | Yamada et al. |
| 6,902,456 | B2 | 6/2005 | George et al. |
| 6,914,382 | B2 | 7/2005 | Ishimoto et al. |
| 6,917,351 | B1 | 7/2005 | Wedding et al. |
| 6,928,227 | B2 | 8/2005 | Shaw et al. |
| 6,930,442 | B2 | 8/2005 | Awamoto et al. |
| 6,932,664 | B2 | 8/2005 | Yamada et al. |
| 6,935,913 | B2 | 8/2005 | Wyeth et al. |
| 6,969,292 | B2 | 11/2005 | Tokai et al. |
| 6,975,068 | B2 | 12/2005 | Green et al. |
| 7,005,793 | B2 | 2/2006 | George et al. |
| 7,025,648 | B2 | 4/2006 | Green et al. |
| 7,049,748 | B2 | 5/2006 | Tokai et al. |
| 7,083,681 | B2 | 8/2006 | Yamada et al. |
| 7,109,488 | B2 | 9/2006 | Milton |
| 7,122,961 | B1 | 10/2006 | Wedding |
| 7,125,305 | B2 | 10/2006 | Green et al. |
| 7,133,590 | B2 | 11/2006 | Shaw et al. |
| 7,137,857 | B2 | 11/2006 | George et al. |
| 7,140,941 | B2 | 11/2006 | Green et al. |
| 7,141,920 | B2 | 11/2006 | Oskam et al. |
| 7,157,854 | B1 | 1/2007 | Wedding |
| 7,176,628 | B1 | 2/2007 | Wedding |
| 7,208,203 | B2 | 4/2007 | Yamada et al. |
| 7,223,959 | B2 | 5/2007 | Fuller |
| 7,247,989 | B1 | 7/2007 | Wedding |
| 7,276,699 | B2 | 10/2007 | Essex |
| 7,288,014 | B1 | 10/2007 | George et al. |
| 7,307,602 | B1 | 12/2007 | Wedding et al. |
| 7,375,342 | B1 | 5/2008 | Wedding |
| 7,978,154 | B1 * | 7/2011 | Strbik et al. .................... 345/60 |
| 2003/0213923 | A1 | 11/2003 | Kongable et al. |
| 2004/0037538 | A1 | 2/2004 | Schardt et al. |
| 2005/0274145 | A1 * | 12/2005 | Aitken et al. .................... 65/64 |
| 2006/0251369 | A1 | 11/2006 | Shaw et al. |
| 2007/0014318 | A1 | 1/2007 | Hajjar et al. |

* cited by examiner

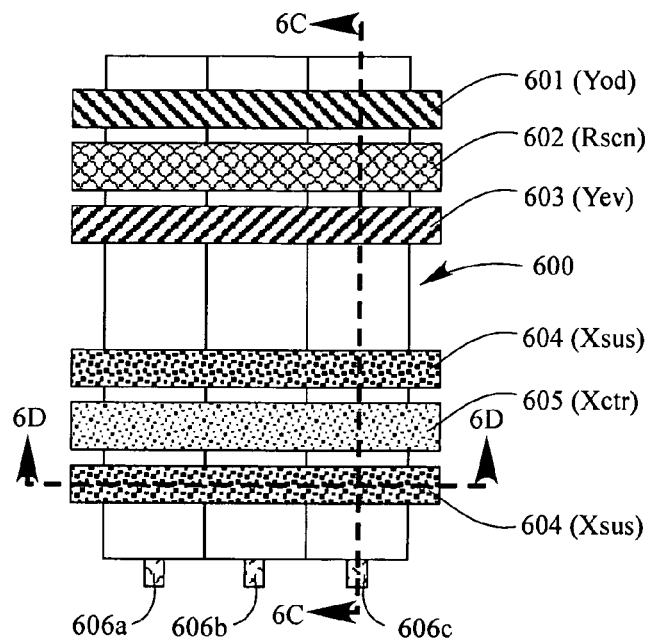
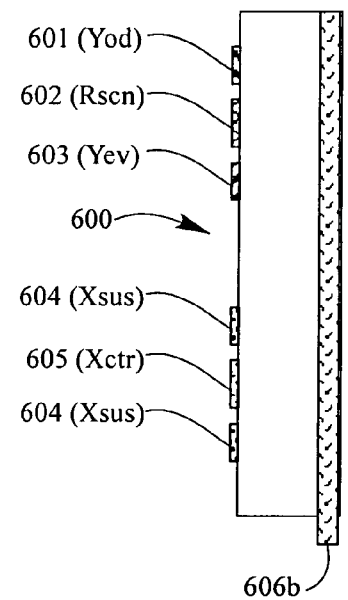
Fig. 6B
Fig. 6C
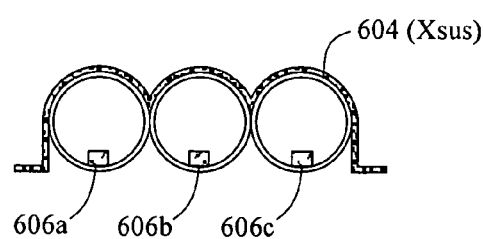
Fig. 6D

PLASMA DISCHARGE DISPLAY WITH FLUORESCENT CONVERSION MATERIAL

RELATED APPLICATIONS

This is a continuation-in-part under 35 U.S.C. 120 of U.S. patent application Ser. No. 11/107,964, filed Apr. 18, 2005, now U.S. Pat. No. 7,405,516 which claims priority under 35 U.S.C. 119(e) for Provisional Patent Application Ser. No. 60/564,942, filed Apr. 26, 2004.

FIELD OF INVENTION

This invention relates to an AC and/or DC gas discharge plasma display panel (PDP) containing a fluorescent conversion material (FCM) that produces infrared (IR) when exited by photons from the gas discharge. In one embodiment, the PDP comprises one or more gas-filled plasma-shells with FCM that emit infrared (IR) photons during gas discharge. In another embodiment, the PDP comprises one or more elongated gas-filled plasma-tubes containing FCM that emit IR during a gas discharge within the tube.

Plasma-shells are hollow microspheres encapsulating an ionizable gas. The plasma-shells are applied to a X—Y addressable substrate to form plasma-shell arrays for IR display applications. The plasma-shell may be operated at high levels of gray scale and frequency. The low cost manufacture and the unique closed cell structure of plasma-shell PDP allow for important technical advantages.

Each plasma-shell contains a fluorescent conversion material (FCM) that produces IR when excited by photons from the gas discharge inside a plasma-shell. The FCM may be located inside and/or outside the plasma-shell and/or incorporated as part of the plasma-shell material. The FCM may be inorganic, organic, or a combination of inorganic and organic materials. Up-conversion (Stokes) and down-conversion FCM materials may be used to provide the IR. In one embodiment, the FCM is a rare earth doped chalcogenide.

The AC and/or DC plasma-shell display panel (PDP) is comprised of a multiplicity of gas-filled plasma-shells on a substrate. As used herein, plasma-shell includes plasma-dome, plasma-disc, and plasma-sphere. The hollow plasma-shells are filled with an ionizable gas and are used as pixels or sub-pixels in the gas discharge plasma display panel (PDP) device having one or more substrates. The substrate may be rigid, flexible, or partially flexible, with a flat, curved, or irregular surface.

BACKGROUND

PDP Structures and Operation

This invention is described with reference to AC and DC gas discharge plasma displays. In a gas discharge plasma display panel (PDP), a single addressable picture element is a cell, sometimes referred to as a pixel. In a multi-color PDP, two or more cells or pixels may be addressed as sub-cells or sub-pixels to form a single cell or pixel. As used herein, cell or pixel means sub-cell or sub-pixel. The cell or pixel element is defined by two or more electrodes positioned in such a way so as to provide a voltage potential across an electrode gap containing an ionizable gas. When sufficient voltage is applied across the gap between the electrodes, the gas ionizes to produce light.

In an AC gas discharge plasma display, the electrodes at a cell site are coated with a dielectric for charge storage and memory. The electrodes are generally grouped in a matrix configuration to allow for selective addressing of each cell or pixel.

To form a display image, several types of voltage pulses may be applied across a plasma display cell gap. These pulses include a write pulse, which is the voltage potential sufficient to ionize the gas at the pixel site. A write pulse is selectively applied across selected cell sites. The ionized gas will produce visible light, UV or IR light, which excites a phosphor to glow. Sustain pulses are a series of pulses that produce a voltage potential across pixels to maintain ionization of cells previously ionized. An erase pulse is used to selectively extinguish ionized pixels. The voltage at which a pixel will ionize, sustain, and erase depends on a number of factors including the distance between the electrodes, the composition of the ionizing gas, and the pressure of the ionizing gas. Also of importance is the dielectric composition and thickness. To maintain uniform electrical characteristics throughout the display it is desired that the various physical parameters adhere to required tolerances. Maintaining the required tolerance depends on cell geometry, fabrication methods, and the materials used. The prior art discloses a variety of plasma display structures, a variety of methods of construction, and materials.

Examples of open cell gas discharge (plasma) devices include both monochrome (single color) AC plasma displays and multi-color (two or more colors) AC plasma displays. Examples of monochrome AC gas discharge (plasma) displays are well known in the prior art and include those disclosed in U.S. Pat. Nos. 3,559,190 (Bitzer et al.), 3,499,167 (Baker et al.), 3,860,846 (Mayer), 3,964,050 (Mayer), 4,080,597 (Mayer), 3,646,384 (Lay) and 4,126,807 (Wedding), all incorporated herein by reference. Examples of multi-color AC plasma displays are well known in the prior art and include those disclosed in U.S. Pat. Nos. 4,233,623 (Pavliscak), 4,320,418 (Pavliscak), 4,827,186 (Knauer et al.), 5,661,500 (Shinoda et al.), 5,674,553 (Shinoda et al.), 5,107,182 (Sano et al.), 5,182,489 (Sano), 5,075,597 (Salavin et al.), 5,742,122 (Amemiya et al.), 5,640,068 (Amemiya et al.), 5,736,815 (Amemiya), 5,541,479 (Nagakubi), 5,745,086 (Weber) and 5,793,158 (Wedding), all incorporated herein by reference.

Monochrome and multi-color DC plasma displays are contemplated. DC gas discharge (plasma) displays are well known in the prior art, for example as disclosed in U.S. Pat. Nos. 3,886,390 (Maloney et al.), 3,886,404 (Kurahashi et al.), 4,035,689 (Ogle et al.), and 4,532,505 (Holz et al.), all incorporated herein by reference.

The PDP industry has used two different AC plasma display panel (PDP) structures, the two-electrode columnar discharge structure, and the three-electrode surface discharge structure. Columnar discharge is also called co-planar discharge.

Columnar PDP

The two-electrode columnar or co-planar discharge AC plasma display structure is disclosed in U.S. Pat. Nos. 3,499,167 (Baker et al.) and 3,559,190 (Bitzer et al.) The two-electrode columnar discharge structure is also referred to as opposing electrode discharge, twin substrate discharge, or co-planar discharge. In the two-electrode columnar discharge AC plasma display structure, the sustaining voltage is applied between an electrode on a rear or bottom substrate and an opposite electrode on the front or top viewing substrate. The gas discharge takes place between the two opposing electrodes in between the top viewing substrate and the bottom substrate.

The columnar discharge PDP structure has been widely used in monochrome AC plasma displays that emit orange or red light from a neon gas discharge. Phosphors are used in a monochrome structure to obtain a color other than neon orange. In a multi-color columnar discharge PDP structure as disclosed in U.S. Pat. No. 5,793,158 (Wedding), phosphor stripes, or layers are deposited along the barrier walls and/or on the bottom substrate adjacent to and extending in the same direction as the bottom electrode. The discharge between the two opposite electrodes generates electrons and ions that bombard and deteriorate the phosphor thereby shortening the life of the phosphor and the PDP. In a two electrode columnar discharge PDP as disclosed by Wedding, '158, each light emitting pixel is defined by a gas discharge between a bottom or rear electrode x and a top or front opposite electrode y, each cross-over of the two opposing arrays of bottom electrodes x and top electrodes y defining a pixel or cell.

Surface Discharge PDP

The three-electrode multi-color surface discharge AC plasma display panel structure is widely disclosed in the prior art including U.S. Pat. Nos. 5,661,500 (Shinoda et al.), 5,674,553, (Shinoda et al.), 5,745,086 (Weber), and 5,736,815 (Amemiya), all incorporated herein by reference. In a surface discharge PDP, each light emitting pixel or cell is defined by the gas discharge between two electrodes on the top substrate. In a multi-color RGB display, the pixels may be called sub-pixels or sub-cells. Photons from the discharge of an ionizable gas at each pixel or sub-pixel excite a photoluminescent phosphor that emits red, blue, or green light. In a three-electrode surface discharge AC plasma display, a sustaining voltage is applied between a pair of adjacent parallel electrodes that are on the front or top viewing substrate. These parallel electrodes are called the bulk sustain electrode and the row scan electrode. The row scan electrode is also called a row sustain electrode because of its dual functions of address and sustain. The opposing electrode on the rear or bottom substrate is a column data electrode and is used to periodically address a row scan electrode on the top substrate. The sustaining voltage is applied to the bulk sustain and row scan electrodes on the top substrate. The gas discharge takes place between the row scan and bulk sustain electrodes on the top viewing substrate.

Single Substrate PDP

There may be used a PDP structure having a so-called single substrate or monolithic plasma display panel structure having one substrate with or without a top or front viewing envelope or dome. Single-substrate or monolithic plasma display panel structures are well known in the prior art and are disclosed by U.S. Pat. Nos. 3,646,384 (Lay), 3,652,891 (Janning), 3,666,981 (Lay), 3,811,061 (Nakayama et al.), 3,860,846 (Mayer), 3,885,195 (Amano), 3,935,494 (Dick et al.), 3,964,050 (Mayer), 4,106,009 (Dick), 4,164,678 (Biazzo et al.), and 4,638,218 (Shinoda et al.), all incorporated herein by reference.

RELATED PRIOR ART

Spheres, Beads, Ampoules, Capsules

The use of gas-filled hollow microspheres in a PDP is known in the prior art. Such microspheres are referred to as spheres, beads, ampoules, capsules, bubbles, shells, and so forth. The following prior art relates to the use of microspheres in a PDP and are incorporated herein by reference. U.S. Pat. No. 2,644,113 (Etzkorn) discloses ampoules or hollow glass beads containing luminescent gases that emit a colored light. In one embodiment, the ampoules are used to radiate ultraviolet light onto a phosphor external to the ampoule itself. U.S. Pat. No. 3,848,248 (MacIntyre) discloses the embedding of gas-filled beads in a transparent dielectric. The beads are filled with a gas using a capillary. The external shell of the beads may contain phosphor. U.S. Pat. No. 3,998,618 (Kreick et al.) discloses the manufacture of gas-filled beads by the cutting of tubing. The tubing is cut into ampoules and heated to form shells. The gas is a rare gas mixture, 95% neon, and 5% argon at a pressure of 300 Torr. U.S. Pat. No. 4,035,690 (Roeber) discloses a plasma panel display with a plasma forming gas encapsulated in clear glass shells. Roeber used commercially available glass shells containing gases such as air, $SO_2$ or $CO_2$ at pressures of 0.2 to 0.3 atmosphere. Roeber discloses the removal of these residual gases by heating the glass shells at an elevated temperature to drive out the gases through the heated walls of the glass shell. Roeber obtains different colors from the glass shells by filling each shell with a gas mixture which emits a color upon discharge, and/or by using a glass shell made from colored glass. U.S. Pat. No. 4,963,792 (Parker) discloses a gas discharge chamber including a transparent dome portion. U.S. Pat. No. 5,326,298 (Hotomi) discloses a light emitter for giving plasma light emission. The light emitter comprises a resin including fine bubbles in which a gas is trapped. The gas is selected from rare gases, hydrocarbons, and nitrogen. Japanese Patent 11238469A, published Aug. 31, 1999, by Tsuruoka Yoshiaki of Dainippon discloses a plasma display panel containing a gas capsule. The gas capsule is provided with a rupturable part, which ruptures when it absorbs a laser beam. U.S. Pat. No. 6,545,422 (George et al.) discloses a light-emitting panel with a plurality of sockets with spherical or other shape micro-components in each socket sandwiched between two substrates. The micro-component includes a shell filled with a plasma-forming gas or other material. The light-emitting panel may be a plasma display, electroluminescent display, or other display device. The following U.S. Patents issued to George et al. and various joint inventors are incorporated herein by reference: U.S. Pat. Nos. 6,570,335 (George et al.), 6,612,889 (Green et al.), 6,620,012 (Johnson et al.), (George et al.), 6,762,566 (George et al.), 6,764,367 (Green et al.), 6,791,264 (Green et al.), 6,796,867 (George et al.), 6,801,001 (Drobot et al.), 6,822,626 (George et al.), 6,902,456 (George et al.), 6,935,913 (Wyeth et al.), and 6,975,068 (Green et al.). Also incorporated herein by reference are the following U.S. Patent Application Publications filed by George et al. and various joint inventors: U.S. Patent Application Publication Nos. 2004/0004445 (George et al.), 2004/0063373 (Johnson et al.), 2004/0106349 (Green et al.), 2004/0166762 (Green et al.), 2005/0095944 (George et al.), and 2005/0206317 (George et al.). Also incorporated herein is U.S. Pat. No. 6,864,631 (Wedding), which discloses a PDP comprised of microspheres filled with ionizable gas.

RELATED PRIOR ART

PDP Tubes

The following prior art references relate to the use of elongated tubes in a PDP and are incorporated herein by reference. U.S. Pat. No. 3,602,754 (Pfaender et al.) discloses a multiple discharge gas display panel in which filamentary or capillary size glass tubes are assembled to form a gas discharge panel. U.S. Pat. Nos. 3,654,680 (Bode et al.), 3,927,342 (Bode et al.), and 4,038,577 (Bode et al.) disclose a gas discharge display in which filamentary or capillary size gas tubes are assembled to form a gas discharge panel. U.S. Pat. No. 3,969,718 (Strom) discloses a plasma display system utilizing tubes arranged in a side-by-side parallel fashion. U.S. Pat. No. 3,990,068 (Mayer et al.) discloses a capillary tube plasma display with a plurality of capillary tubes arranged parallel in a close pattern. U.S. Pat. No. 4,027,188 (Bergman) discloses a tubular plasma display consisting of parallel glass capillary tubes sealed in a plenum and attached to a rigid substrate. U.S. Pat. No. 5,984,747 (Bhagavatula et al.) discloses rib structures for containing plasma in electronic displays that are formed by drawing glass performs into fiber-like rib components. The rib components are then assembled to form rib/channel structures suitable for flat panel displays. U.S. Patent Application Publication 2001/0028216A1 (Tokai et al.) discloses a group of elongated illuminators in a gas discharge device. U.S. Pat. No. 6,255,777 (Kim et al.) and U.S. Patent Application Publication 2002/0017863 (Kim et al.) of Plasmion disclose a capillary electrode discharge PDP device and a method of fabrication. The following U.S. Patents by Fujitsu Ltd. of Kawasaki, Japan disclose PDP structures with elongated display tubes and are incorporated herein by reference: U.S. Pat. Nos. 6,914,382 (Ishimoto et al.); 6,893,677 (Yamada et al.); 6,857,923 (Yamada et al.); 6,841,929 (Ishimoto et al.); 6,836,064 (Yamada et al.); 6,836,063 (Ishimoto et al.); 6,794,812 (Yamada et al.); 6,677,704 (Ishimoto et al.); 6,650,055 (Ishimoto et al.); and 6,633,117 (Shinoda et al.).

The following applications filed by Fujitsu Ltd. of Kawasaki, Japan disclose PDP structures with elongated display tubes and are incorporated herein by reference: U.S. Patent Application Publication Nos. 2005/0115495 (Yamada et al.), 2004/0152389 (Tokai et al.), 2004/0033319 (Yamada et al.), 2003/0214224 (Awamoto et al.), 2003/0182967 (Tokai et al.), 2003/0122485 (Tokai et al.), and 2003/0025451 (Yamada et al.).

As used herein elongated tube is intended to include capillary, filament, filamentary, illuminator, hollow rods, or other such terms. It includes an elongated enclosed gas-filled structure having a length dimension, which is greater than its cross-sectional width dimension. The width of the tube is typically the viewing direction of the display. Also as used herein, an elongated plasma-tube has multiple gas discharge pixels of 100 or more, typically 500 to 1000 or more, whereas a plasma-shell typically has only one gas discharge pixel. In some special embodiments, the plasma-shell may have more than one pixel, i.e., 2, 3, or 4 pixels up to 10 pixels. The U.S. Patents issued to George et al. and listed above as related microsphere prior art also disclose elongated tubes and are incorporated herein by reference.

SUMMARY OF INVENTION

In accordance with this invention, there is provided an AC or DC gas discharge display panel containing a fluorescent conversion material (FCM) that emits IR when excited by photons from the gas discharge. In one embodiment, this invention relates to an AC and/or DC plasma display panel (PDP) comprised of a multiplicity of plasma-shells, each plasma-shell containing a fluorescent conversion material (FCM). In one embodiment, the FCM is a rare earth doped chalcogenide. In the practice of this invention, each plasma-shell is mounted on a substrate and each plasma-shell is electrically connected to at least two electrical conductors such as electrodes. The plasma-shell may be located on the surface of the substrate or within the substrate. The locating or placing of the plasma-shell on the substrate and/or electrodes includes positioning, attaching, mounting, or like contact. In one embodiment of this invention, insulating barriers are provided to prevent contact between the connecting electrodes. The plasma-shell may be of any suitable geometric shape such as a plasma-sphere, plasma-disc, or plasma-dome. As used herein, plasma-shell includes plasma-sphere, plasma-disc, and/or plasma-dome. As illustrated herein, this invention includes plasma-shells of one geometric shape alone or in combination with plasma-shells of other geometric shapes.

A plasma-sphere is a hollow sphere with relatively uniform shell thickness. The shell is typically composed of a dielectric material and is filled with an ionizable gas at a desired mixture and pressure. The shell material is selected to optimize dielectric properties and optical transmissivity.

A plasma-disc may be the same as a plasma-sphere in material composition and the ionizable gas selection. It differs in geometric shape from the plasma-sphere in that it is flat on two opposing sides such as the top and bottom. As used herein, a flat side is defined as a side having a flat surface. The other sides or ends of the plasma-disc may be round or flat. The plasma-disc may have other flat sides in addition to the opposing flat sides. The plasma-disc does not have to be round or circular. It may have any geometric shape with opposing flat sides.

A plasma-dome may be the same as a plasma-sphere and plasma-disc in material composition and the ionizable gas selection. It differs in geometric shape in that one side is rounded or domed and the opposing side is flat, such as a flat bottom and domed top or vice versa. Other sides of the plasma-dome may be flat or domed. A variety of geometric shapes are contemplated, some of which are disclosed herein.

Fluorescent Conversion Material

The FCM is added to the inner or outer surface of the plasma-shell. The FCM may also be incorporated in the shell. In one embodiment, the shell is made out of the FCM. The FCM may comprise any suitable inorganic and/or organic substances that emit IR when excited by photons from the gas discharge. The organic and/or inorganic FCM may be added directly to the shell material or composition during or after shell formation using thin film and/or thick film processes.

In one embodiment of this invention, the fluorescent conversion material is a rare earth doped chalcogenide material including a glass. A chalcogenide material is one containing a chalcogenide element (sulfur, selenium, or tellurium) as the substantial constituent. The rare earth dopant is selected from one or more members of Group IIIB Periodic Table, the Lanthanide Series, and the Actinide Series, particularly Sc, Y, La, Ce, Pr, Nd, Pm, Sm, Eu, Gd, Tb, Ac, Th, Pa, and U.

The following references relate to chalcogenide materials, and are incorporated herein by reference: U.S. Pat. Nos. 5,629,953 (Bishop et al.), 6,504,645 (Lenz et al.), 6,928,227 (Shaw et al.), 7,133,590 (Shaw et al.), and U.S. Patent Application Publication 2006/0251369 (Shaw et al.).

FCM possess the ability to absorb plasma discharge emitted radiation of a first wavelength and then, through a process of non-radiative and radiative transitions, emit one or more photons at a second longer wavelength. A preferred FCM embodiment for this conversion for IR light radiation generation comprises a host material of a chalcogenide glass doped with rare earth ions. Chalcogenide glasses are composed of the chalcogen elements, S, Se, and Te with mid-wave IR (MWIR) and long-wave IR (LWIR) transparencies up to 20 microns wavelength. Chalcogenide glass is highly transparent to IR radiation with many efficient formulations including bulk glasses such as chalcogenides, tellurides, fluorides, silicates, and chelates as well as crystals such as $YLiF_4$, PaYF, $BaY_2F_8$. One preferred rare earth doped chalcogenide glass FCM contains the trivalent rare earth ion Praseodymium ($Pr^{3+}$) as a dopant. Other rare earth doped chalcogenide glass FCM formulations including but not limited to Europium ($Eu^{3+}$) may also be used.

When fabricated into a display comprising a host material of chalcogenide glass doped with trivalent rare earth elements such as $Pr^{3+}$, an FCM may be produced that will down convert visible and near-IR light wavelengths to longer wavelength IR wavelength emissions. The pumping energy absorbed by the FCM is reradiated as a longer IR wavelength emission in proportion to the intensity of the pumping energy waveform.

A number of the rare earth ions have electronic transitions that provide for emissions in MWIR and LWIR wavelengths and effectively convert visible and near-IR used as dopants in chalcogenide glass. By contrast, when rare earth dopants are used in silica glass, MWIR and LWIR transitions of the rare earth ions are quenched and do not produce MWIR and LWIR light. In chalcogenide glass, these transitions are active and exhibit broadband emissions when optically pumped in near-IR wavelengths by plasma emissions. Thus, rare earth doped chalcogenide glass can be utilized to transform near-IR plasma emissions into bright MWIR and LWIR light.

Rare earth doped chalcogenide glass also has a high non-linearities, allowing its use as a nonlinear a conversion source that can act as a broadband supercontinuum conversion source spanning hundreds of nanometers. The broadband transparency of chalcogenide glass provides the means to provide supercontinuum IR sources which cover large portions of the MWIR and LWIR spectrum. Super continuum IR imagery is especially useful for the evaluating, testing and calibrating of IR sensors for real world broadband environment.

BRIEF DESCRIPTION OF THE DRAWINGS

FIG. 6B illustrates the top view of the electrode structure of FIG. 6A.

FIG. 6C illustrates a section 6C-6C view of the structure of FIG. 6A.

FIG. 6D illustrates a section 6D-6D view of the structure of FIG. 6A.

DETAILED DESCRIPTION OF THE DRAWINGS

Figure 1:
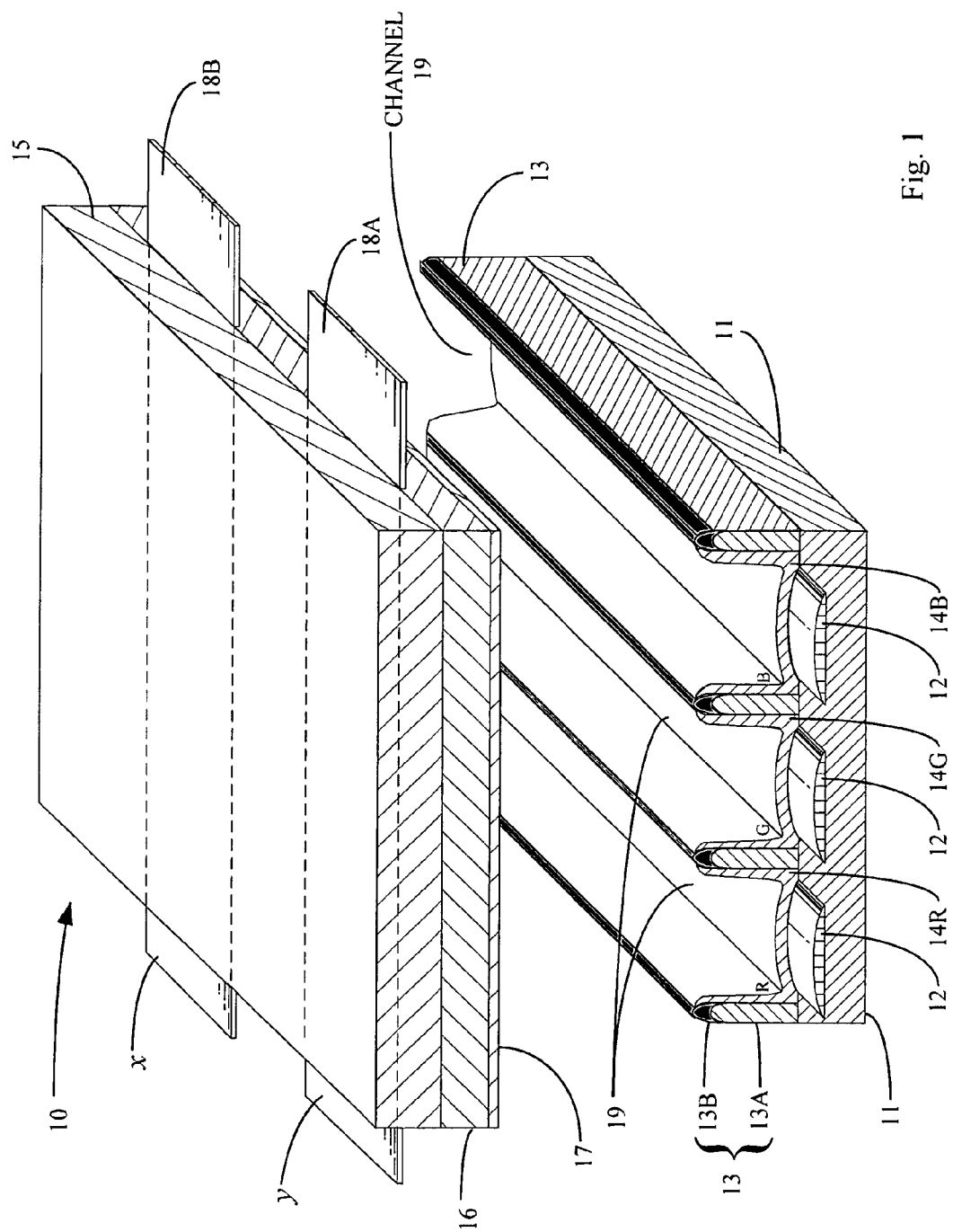
FIG. 1 shows a prospective view of an AC gas discharge (plasma) display panel with dual or opposing substrates.
Figure 2:
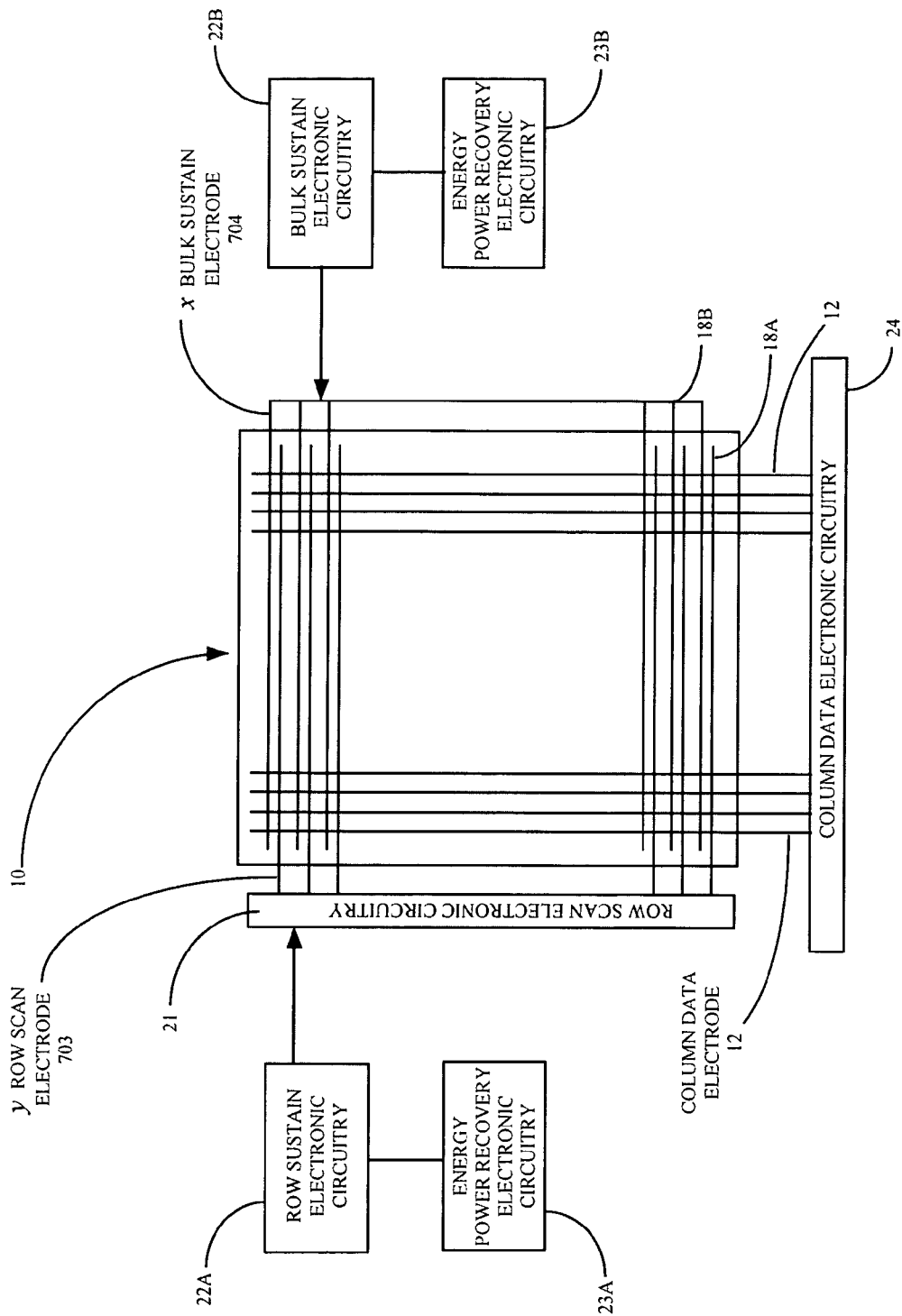
FIG. 2 shows a block diagram for driving an AC gas discharge plasma display.

FIG. 1 shows a dual substrate surface discharge AC gas discharge plasma display panel structure 10 similar to the structure illustrated and described in FIG. 2 of U.S. Pat. No. 5,661,500 (Shinoda et al.) cited above and incorporated herein by reference. The panel structure 10 has a bottom or rear glass substrate 11 and a top substrate 15.

In the prior art, the bottom substrate 11 contains electrodes 12, barriers 13 and phosphor 14R, 14G, 14B. Each barrier 13 comprises a bottom portion 13A and a top portion 13B. The top portion 13B is dark or black for increased contrast ratio. The bottom portion 13A may be translucent, opaque, dark, or black.

The top substrate 15 is transparent glass for viewing and contains y row scan electrode 18A and x bulk sustain electrode 18B, dielectric layer 16 covering the electrodes 18A and 18B, and a magnesium oxide layer 17 covering the surface of dielectric 16. The magnesium oxide is for secondary ion emission and decreases the overall operating voltage of the display.

A plurality of channels 19 are formed by the barriers 13 and phosphor 14. When the two substrates 11 and 15 are sealed together, an ionizable gas mixture is introduced into the channels 19. This is typically a Penning mixture of the rare gases such as neon, argon, xenon, krypton, and/or helium.

Each electrode 12 on the bottom substrate 11 is called a column data electrode. The y electrode 18A on the top substrate 15 is the row scan electrode and the x electrode 18B on the top substrate 15 is the bulk sustain electrode. The gas discharge is initiated by voltages applied between a bottom column data electrode 12 and a top y row scan electrode 18A. The sustaining of the resulting discharge is done between an electrode pair of the top y row scan electrode 18A and a top x bulk sustain electrode 18B. Each pair of the y and x electrodes is a row.

In the prior art multi-color PDP, there are three phosphors 14R, 14G, and 14B. Phosphor 14R emits red luminance when excited by photons from the gas discharge within the plasma panel. Phosphor 14G emits green luminance when excited by photons from the gas discharge within the plasma panel. Phosphor 14B emits blue luminance when excited by photons for the gas discharge within the plasma panel. The phosphors may be selected from inorganic and/or organic luminescent substances including mixtures of luminescent substances. In this invention, one or more of the phosphors is an FCM that emits IR when excited by photons from a gas discharge.

The row scan electrode 18A and the bulk sustain electrode 18B may each be a transparent material such as tin oxide or indium tin oxide (ITO) with a thin conductive ribbon or bus bar along one edge. The ribbon may be any conductive material including gold, silver, chrome-copper-chrome, or like material.

The drive system for an AC plasma display includes electronic circuitry for applying write voltage pulses, erase voltage pulses, and sustain voltage pulses in a selectable fashion to one or more cells. A write pulse at a cell cite causes the gas to discharge and emit light. An erase pulse causes the plasma to extinguish. A sustain pulse causes a cell previously written to continue to emit light until subjected to an erase pulse.

A basic electronic architecture for applying voltages to the three electrodes 12, 18A, 18B is disclosed in U.S. Pat. Nos. 5,661,500 (Shinoda et al.), 5,674,553 (Shinoda et al.), and 5,446,344 (Kanazawa), incorporated herein by reference. This basic architecture is widely used in the PDP industry for addressing and sustaining AC gas discharge (plasma) displays and has been labeled by Fujitsu as ADS (Address Display Separately). In addition to ADS, other suitable architectures are known in the art and are available for addressing and sustaining the electrodes 12, 18A, and 18B of FIG. 1.

FIG. 2 shows display panel 10 with electronic circuitry 21 for the y row scan electrodes 703, bulk sustain electronic circuitry 22B for x bulk sustain electrode 704 and column data electronic circuitry 24 for the column data electrodes 12.

There is also shown row sustain electronic circuitry 22A with an energy power recovery electronic circuit 23A. There is also shown energy power recovery electronic circuitry 23B for the bulk sustain electronic circuitry 22B.

A basic electronics architecture for addressing and sustaining a surface discharge AC plasma display is called Address Display Separately (ADS). The ADS architecture may be used for a monochrome or multi-color display. The ADS architecture is disclosed in a number of Fujitsu patents including patents cited above. ADS has become a basic electronic architecture widely used in the AC plasma display industry for the manufacture of monitors and television. Fujitsu ADS architecture is commercially used by Fujitsu and is also widely used by competing manufacturers including Matsushita and others.

Another electronic architecture is called Address While Display (AWD). The AWD electronics architecture was first used during the 1970s and 1980s for addressing and sustaining monochrome PDP. In AWD architecture, the addressing (write and/or erase pulses) are interspersed with the sustain waveform and may include the incorporation of address pulses onto the sustain waveform. Such address pulses may be on top of the sustain waveform and/or on a sustain waveform notch or pedestal. See for example U.S. Pat. Nos. 3,801, 861 (Petty et al.) and 3,803,449 (Schmersal). FIGS. 1 and 3 of the Shinoda '054 ADS patent disclose AWD architecture as prior art.

The AWD electronics architecture for addressing and sustaining monochrome PDP has also been adopted for addressing and sustaining multi-color PDP. For example, Samsung Display Devices Co., Ltd., has disclosed AWD and the superimpose of address pulses with the sustain pulse. Samsung specifically labels this as Address While Display (AWD). See High-Luminance and High-Contrast HDTV PDP with Overlapping Driving Scheme, J. Ryeom et al., pages 743 to 746, Proceedings of the Sixth International Display Workshops, IDW 99, Dec. 1-3, 1999, Sendai, Japan. AWD is also disclosed in U.S. Pat. No. 6,208,081 (Eo et al).

LG Electronics Inc. has disclosed a variation of AWD with a Multiple Addressing in a Single Sustain (MASS) in U.S. Pat. No. 6,198,476 (Hong et al.). Also see U.S. Pat. No. 5,914,563 (Lee et al.).

The electronics architecture for addressing and sustaining the AC gas discharge may be ADS as described in Shinoda '618 and '054. In addition, other architectures as described herein and known in the prior art may be utilized.

Examples of energy recovery architecture and circuits are well known in the prior art. These include U.S. Pat. Nos. 4,772,884 (Weber et al.), 4,866,349 (Weber et al.), 5,081,400 (Weber et al.), 5,438,290 (Tanaka), 5,642,018 (Marcotte), 5,670,974 (Ohba et al.), 5,808,420 (Rilly et al.), and 5,828, 353 (Kishi et al.), all incorporated herein by reference. These may be used with the ADS or other architectures.

Figure 3A:
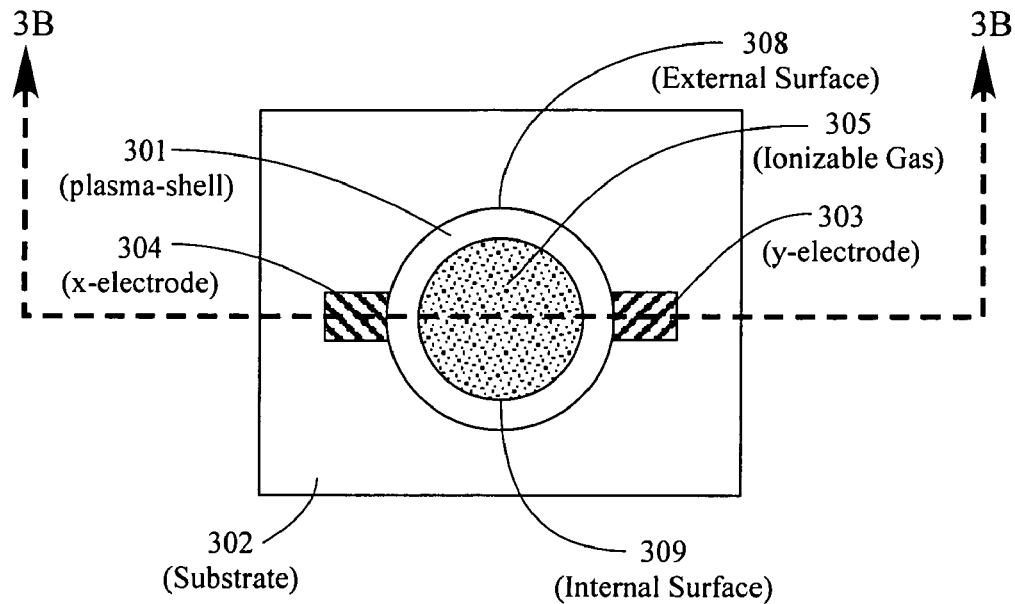
FIG. 3A is a top view of a monolithic or single substrate PDP with a plasma-sphere mounted on the surface of a substrate.

FIG. 3A is a top view of a single substrate PDP with plasma-shell 301 having an internal surface 309 and external surface 308 containing an ionizable gas 305. The plasma-shell 301 is positioned on the surface of a single substrate 302 in contact with electrodes 303 and 304.

Figure 3B:
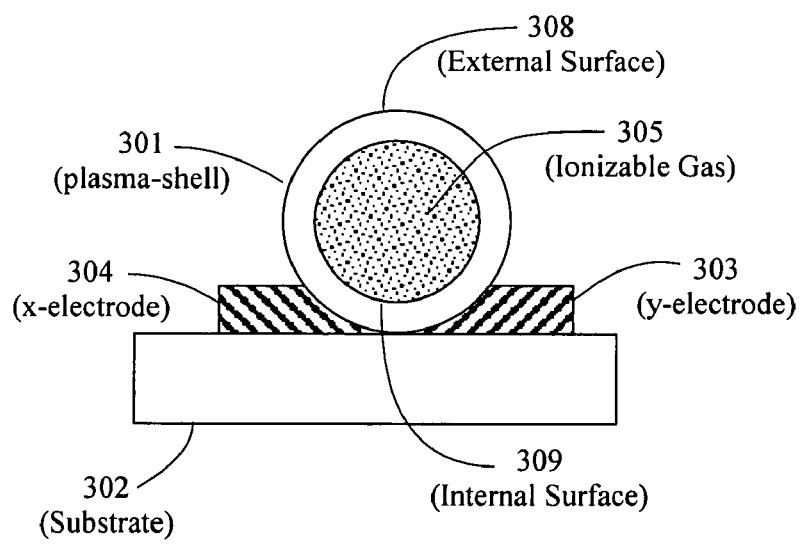
FIG. 3B is a section 3B-3B view of FIG. 3A.

FIG. 3B is a section 3B-3B view of a plasma-shell 301 having an internal surface 309 and external surface 308 located on the surface of the substrate 302 in electrical contact with electrodes 303 and 304. FCM is contained within each plasma-shell and emits IR when excited by photons from a gas discharge within a plasma-shell. The FCM may be incorporated in the plasma-shell and/or deposited as a thin film or thick film on the plasma-shell.

Figure 4A:
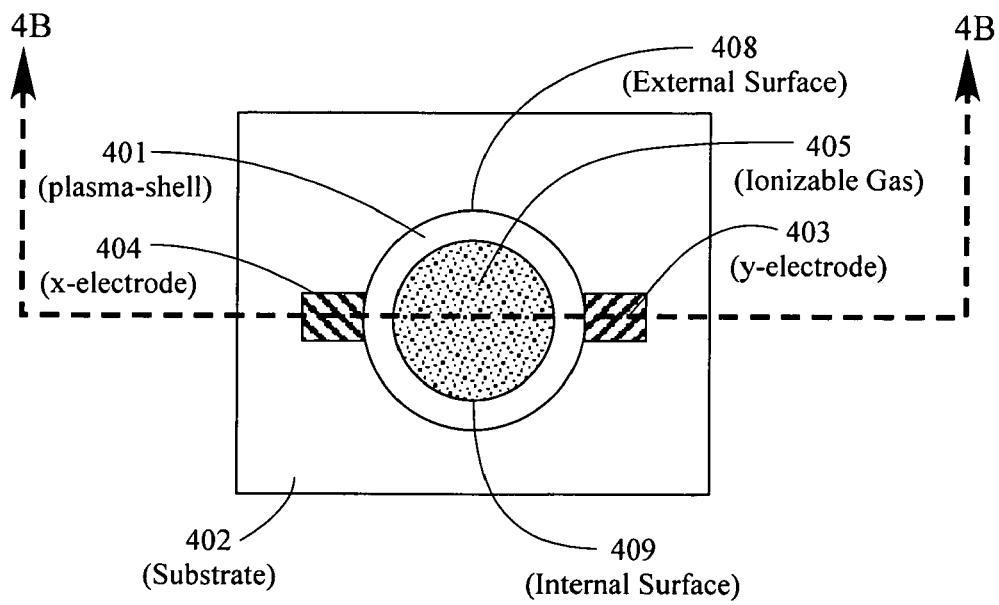
FIG. 4A is a top view of a monolithic or single substrate PDP with a plasma-sphere mounted within a cavity, hollow, or well in a substrate.

FIG. 4A is a top view of a single substrate PDP with plasma-shell 401 having an internal surface 409 and external surface 408 containing an ionizable gas 405.

Figure 4B:
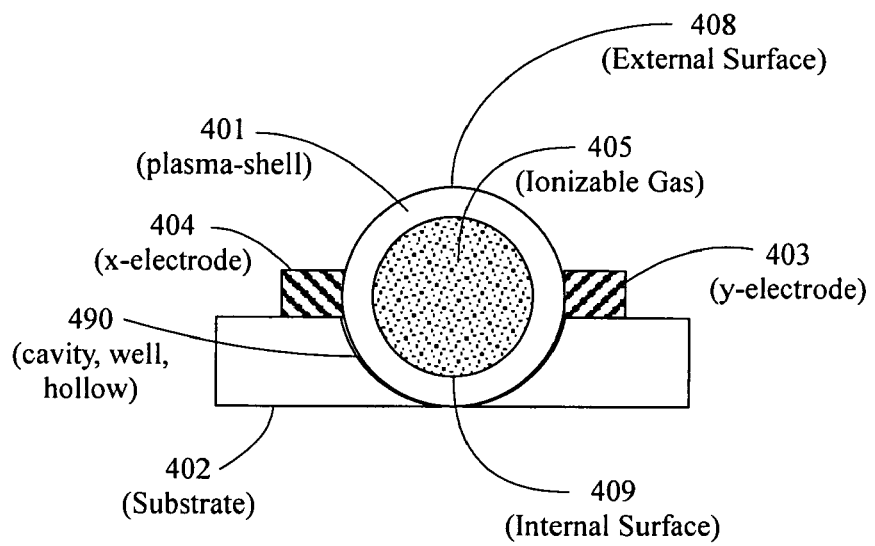
FIG. 4B is a section 4B-4B view of FIG. 4A.

FIG. 4B is a section 4B-4B view of a plasma-shell 401 having an internal surface 409 and external surface 408. The plasma-shell 401 is positioned or located within a cavity, hollow, or well 490 in the substrate 402 and in electrical contact with electrodes 403 and 404. FCM is contained within each plasma-shell and emits IR when excited by photons from a gas discharge within a plasma-shell.

Figure 5:
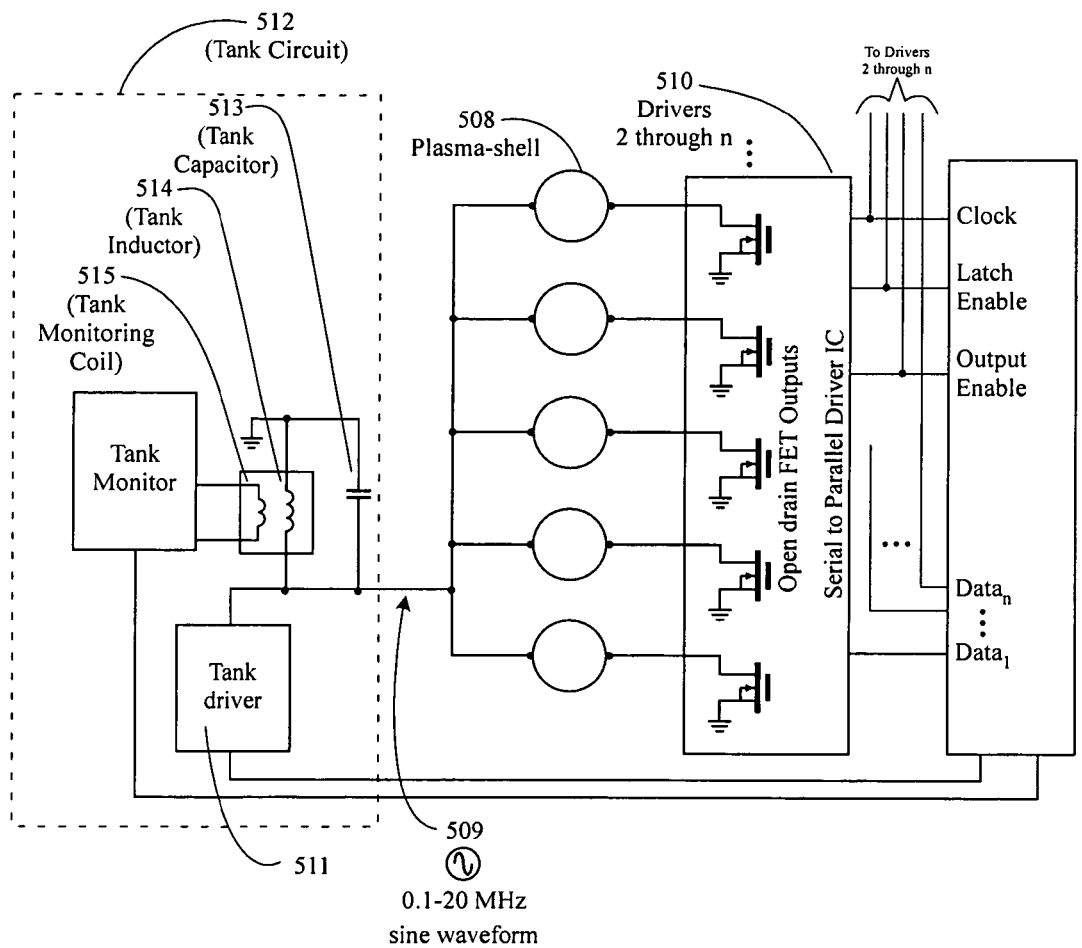
FIG. 5 is a schematic diagram showing electronic circuitry for driving an array of plasma-shells.

FIG. 5 is a schematic diagram showing electronic circuitry suitable for operating an array of plasma-shells 508. The plasma-shells 508 produce high luminance when driven with high frequency and high voltage excitation. The high frequency circuitry provides a sine waveform 509 to the plasma-shell array. The principle circuit element is an open drain, low capacitance, high voltage IC output 510 in series with each plasma-shell 508 and the high voltage common AC driving source. When an IC output 510 is ON, the AC voltage from the source is imposed across an individual plasma-shell 508, which has enough amplitude to quickly light (ionize) the plasma-shell 508. When the output 510 is OFF most of the source voltage appears across the low capacitance open drain output and therefore the plasma-shell turns OFF. This full parallel drive to all plasma-shells simultaneously synchronized with the 1 MHz high voltage power source provides digital control of the AC plasma-shells without the requirement of discharge memory. Thus 500 levels of gray at 2,000 hertz to 10,000 levels of gray at 100 hertz is achieved.

The electronic drive circuit includes a high frequency (1.2 MHz) L-C tank circuit 512 with a drive transistor 511. This drive transistor 511 may be a single transistor that pulls the waveform to a positive or negative peak or a pair of transistors, one transistor that pulls the waveform to a positive peak and one transistor that pulls the waveform to a negative peak. The single transistor or pair of transistors are energy efficient because these transistors supply charge or energy to the tank capacitor 513 and/or tank inductor 514 only when there is low voltage across the transistor supplying the charge or energy. The tank circuit 512 provides a very efficient use of electrical energy without the need for additional energy recovery circuitry. The prior art energy recovery circuitry increases electronic complexity and is also less efficient than the parallel tank circuit drive.

Figure 6A:
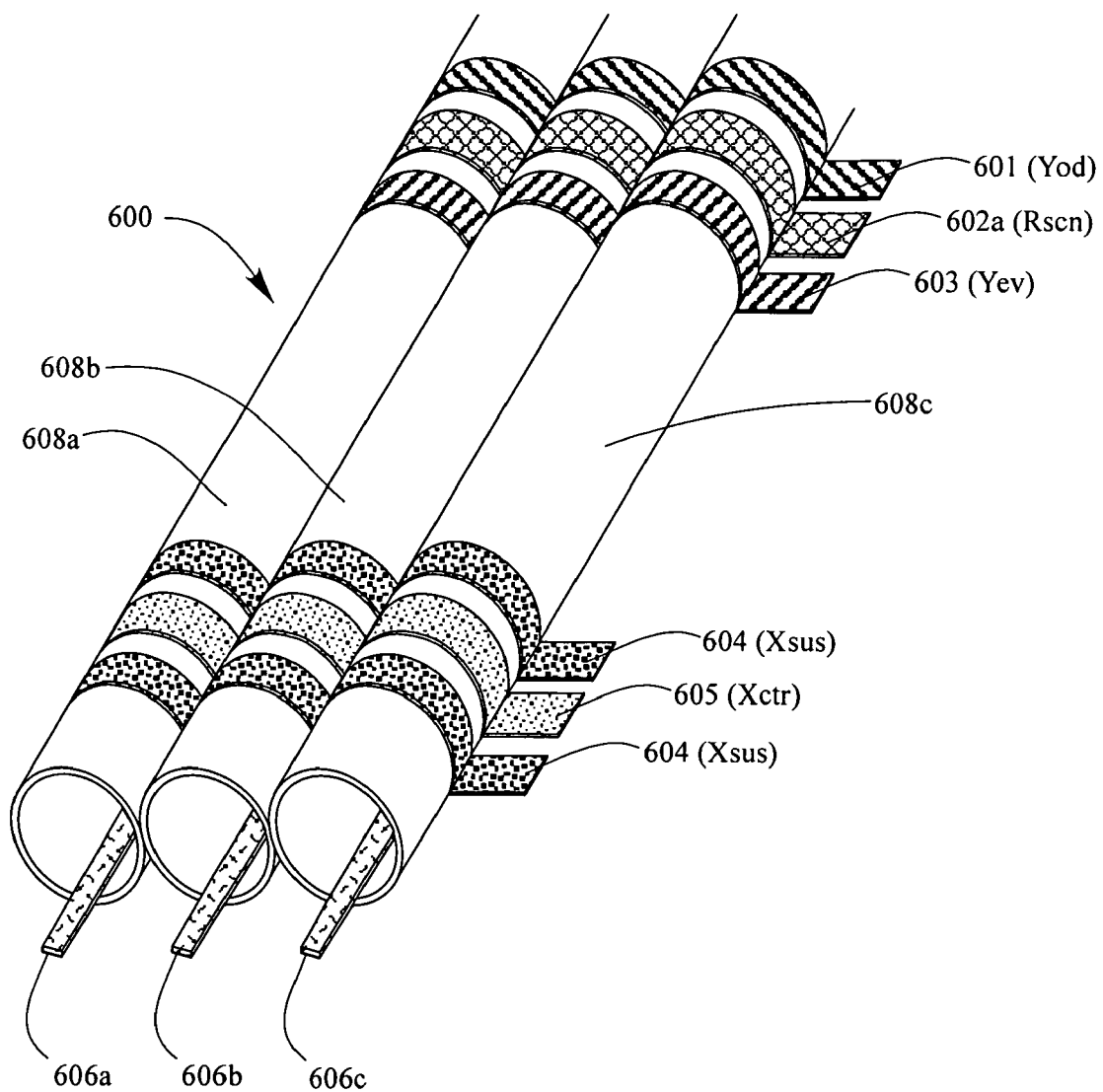
FIG. 6A illustrates the electrode structure for an AC plasma display pixel using plasma-tubes.

FIG. 6A shows a tubular PDP electrode structure 600 comprising multiple elongated plasma-tubes 608a, 608b, 608c filled with ionizable gas. FCM is located inside or outside each tube 608a, 608b, 608c and emits IR when excited by a gas discharge within an elongated tube. The FCM may be incorporated in the shell of each plasma-tube. The display's row sustain electrodes, consisting of X sustain (Xsus) 604 and opposing Y odd (Yod) 601 or Y even (Yev) 603 sustain electrodes, have a distance separation between them. The separation is sufficient to allow positive column gas discharge sustaining, typically 800 microns or more. Row scan electrodes (Rscn) 602a are positioned between Yod 601 and Yev 603 sustain electrodes. The X Center electrodes (Xctr) 605 are in the space between the Xsus electrodes 604. Also, during the addressing period unwanted light is produced at the Row Scan electrodes (Rscn) 602a. While the X Center electrodes (Xctr) 605 and Row Scan electrodes (Rscn) 602a mask out a substantial portion of this unwanted light, further improvement is made possible by the addition of horizontal black stripes (not shown) covering the area between the display's rows. The masking out of unwanted light and the use of black stripes provides a very high contrast ratio for the display. Column Data electrodes 606a, 606b, 606c are used in addressing each sub-pixel.

The Row Scan and Column Data electrodes are the display's addressing electrodes. In this design the wide Row Scan electrode has a greater area facing the Column Data electrode, which reduces the discharge delay. The addressing electrodes are separate from and driven independently from sustain X and Y electrodes. Therefore this design is a true independent sustain/address type. All electrodes whose drive voltage pulses are in opposition make their electrode connections to opposite sides of the panel.

FIG. 6B is a top view of a tubular PDP electrode structure 600 showing Y odd electrode 601, Row scan electrode 602, Y even electrode 603, X sustain electrode 604, X center electrode 605, and Column Data electrodes 606a, 606b, 606c.

FIG. 6C is a section 6C-6C view of the tubular PDP electrode structure 600 seen in FIG. 6B. Shown are Y odd electrode 601, Row scan electrode 602, Y even electrode 603, X sustain electrode 604, X center electrode 605, and Column Data electrode 606c.

FIG. 6D is a section 6D-6D view of the tubular PDP electrode structure 600 seen in FIG. 6B. Shown are X sustain electrode 604 and Column Data electrodes 606a, 606b, 606c.

Figure 7:
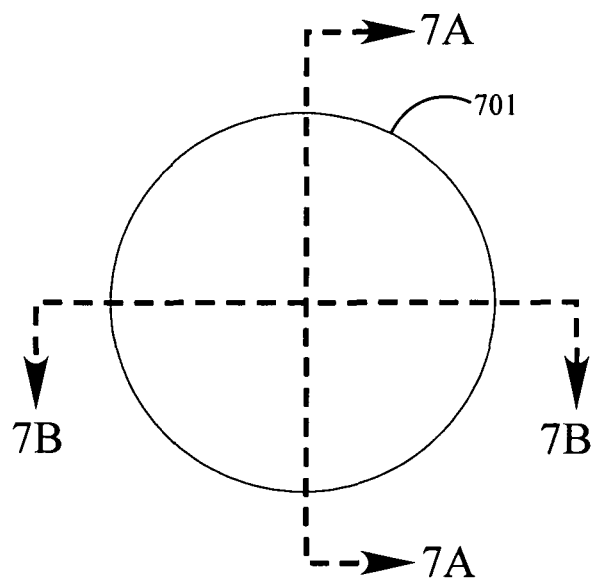
FIG. 7 is a top view of a plasma-dome with one flat side.
Figure 7A:
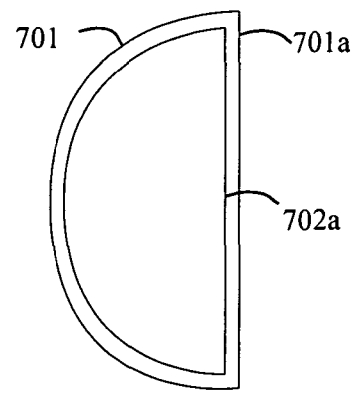
FIG. 7A is a section 7A-7A view of a plasma-dome with one flat side.
Figure 7B:
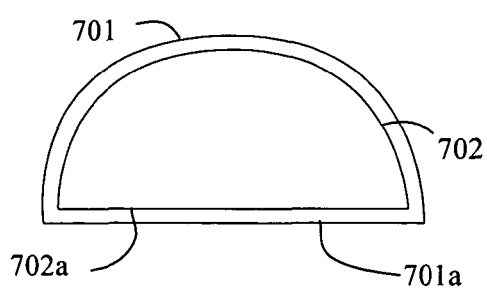
FIG. 7B is a section 7B-7B view of a plasma-dome with one flat side.

A plasma-dome is shown in FIGS. 7, 7A, and 7B. FIG. 7 is a top view of a plasma-dome showing an outer shell wall 701. FIG. 7A is a section 7A-7A view of FIG. 7 showing a flattened outer wall 701a and flattened inner wall 702a. FIG. 7B is a section 7B-7B view of FIG. 7.

Figure 8:
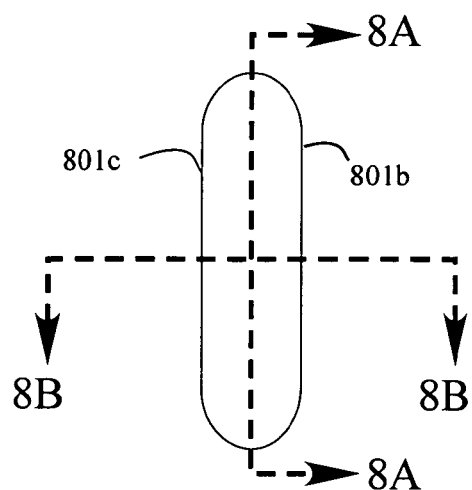
FIG. 8 is a top view of a plasma-dome with multiple flat sides.
Figure 8A:
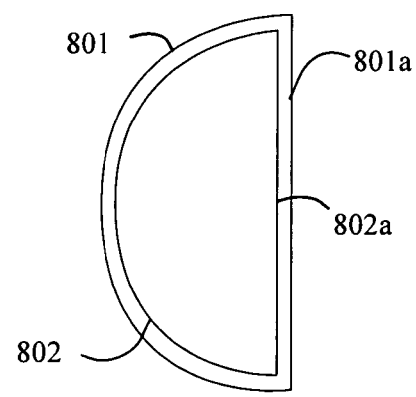
FIG. 8A is a section 8A-8A view of a plasma-dome with multiple flat sides.
Figure 8B:
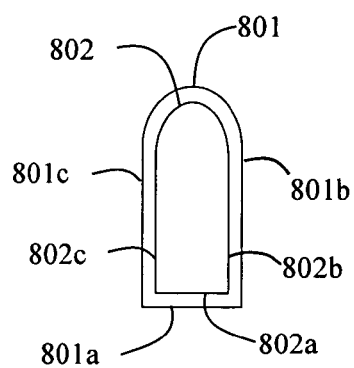
FIG. 8B is a section 8B-8B view of a plasma-dome with multiple flat sides.

FIG. 8 is a top view of a plasma-dome with flattened outer shell wall 801b and 801c. FIG. 8A is a section 8A-8A view of FIG. 8 showing flattened outer wall 801a and flattened inner wall 802a with a dome having outer wall 801 and inner wall 802. FIG. 8B is a section 8B-8B view of FIG. 8. In forming a PDP, the dome portion may be positioned within the substrate with the flat side up in the viewing direction or with the dome portion up in the viewing direction.

Figure 9:
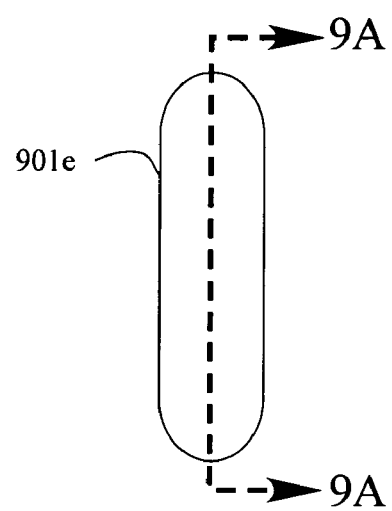
FIG. 9 is a top view of a plasma-disc.
Figure 9A:
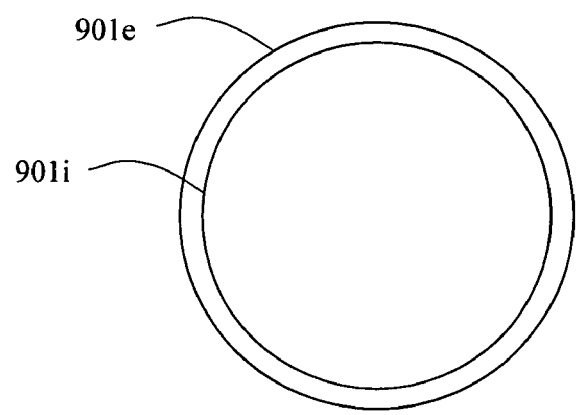
FIG. 9A is a section 9A-9A view of a plasma-disc.

FIG. 9 shows a plasma-disc with opposing flat exterior surfaces 901e. FIG. 9A is a section 9A-9A view of a plasma-disc shown in FIG. 9 with opposite flat sides (not shown) and inner surface 901i and exterior surface of 901e.

Methods of Producing Microspheres

Numerous methods and processes to produce hollow shells or microspheres are well known in the prior art. Microspheres have been formed from glass, ceramic, metal, plastic, and other inorganic and organic materials. Varying methods and processes for producing shells and microspheres have been disclosed and practiced in the prior art. Some methods used to produce hollow glass microspheres incorporate a so-called blowing gas into the lattice of a glass while in frit form. The frit is heated and glass bubbles are formed by the in-permeation of the blowing gas. Microspheres formed by this method have diameters ranging from about 5 µm to approximately 5,000 µm. Methods of manufacturing glass frit for forming hollow microspheres are disclosed by U.S. Pat. Nos. 4,017,290 (Budrick et al.) and 4,021,253 (Budrick et al.). Budrick et al. '290 discloses a process whereby occluded material gasifies to form the hollow microsphere. Hollow microspheres are disclosed in U.S. Pat. Nos. 5,500,287 (Henderson) and 5,501,871 (Henderson). According to Henderson '287, the hollow microspheres are formed by dissolving a permeant gas (or gases) into glass frit particles. The gas permeated frit particles are then heated at a high temperature sufficient to blow the frit particles into hollow microspheres containing the permeant gases. The gases may be subsequently out-permeated and evacuated from the hollow shell as described in step D in column 3 of Henderson '287.

U.S. Pat. No. 4,257,798 (Hendricks et al.) discloses a method for manufacturing small hollow glass spheres filled with a gas introduced during the formation of the spheres, and is incorporated herein by reference. The gases disclosed include argon, krypton, xenon, bromine, DT, hydrogen, deuterium, helium, hydrogen, neon, and carbon dioxide. Other Hendricks patents for the manufacture of glass spheres include U.S. Pat. Nos. 4,133,854 and 4,186,637, both incorporated herein by reference.

Microspheres are also produced as disclosed in U.S. Pat. No. 4,415,512 (Torobin), incorporated herein by reference. This method by Torobin comprises forming a film of molten glass across a blowing nozzle and applying a blowing gas at a positive pressure on the inner surface of the film to blow the film and form an elongated cylinder shaped liquid film of molten glass. An inert entraining fluid is directed over and around the blowing nozzle at an angle to the axis of the blowing nozzle so that the entraining fluid dynamically induces a pulsating or fluctuating pressure at the opposite side of the blowing nozzle in the wake of the blowing nozzle. The continued movement of the entraining fluid produces asymmetric fluid drag forces on a molten glass cylinder, which close and detach the elongated cylinder from the coaxial blowing nozzle. Surface tension forces acting on the detached cylinder form the latter into a spherical shape, which is rapidly cooled and solidified by cooling means to form a glass microsphere. In one embodiment of the above method for producing the microspheres, the ambient pressure external to the blowing nozzle is maintained at a super atmospheric pressure. The ambient pressure external to the blowing nozzle is such that it substantially balances, but is slightly less than the blowing gas pressure. Such a method is disclosed by U.S. Pat. No. 4,303,432 (Torobin) and WO 8000438A1 (Torobin), both incorporated herein by reference. The microspheres may also be produced using a centrifuge apparatus and method as disclosed by U.S. Pat. No. 4,303,433 (Torobin) and WO8000695A1 (Torobin), both incorporated herein by reference. Other methods for forming microspheres of glass, ceramic, metal, plastic, and other materials are disclosed in other Torobin patents including U.S. Pat. Nos. 5,397,759; 5,225,123; 5,212,143; 4,793,980; 4,777,154; 4,743,545; 4,671,909; 4,637,990; 4,582,534; 4,568,389; 4,548,196; 4,525,314; 4,363,646; 4,303,736; 4,303,732; 4,303,731; 4,303,603; 4,303,431; 4,303,730; 4,303,729; and 4,303,061, all incorporated herein by reference. U.S. Pat. No. 3,607,169 (Coxe) discloses an extrusion method in which a gas is blown into molten glass and individual shells are formed. As the shells leave the chamber, they cool and some of the gas is trapped inside. Because the shells cool and drop at the same time, the shells do not form uniformly. It is also difficult to control the amount and composition of gas that remains in the shell. U.S. Pat. No. 4,349,456 (Sowman), incorporated herein by reference, discloses a process for making ceramic metal oxide microspheres by blowing a slurry of ceramic and highly volatile organic fluid through a coaxial nozzle. As the liquid dehydrates, gelled microcapsules are formed. These microcapsules are recovered by filtration, dried, and fired to convert them into microspheres. Prior to firing, the microcapsules are sufficiently porous that, if placed in a vacuum during the firing process, the gases can be removed and the resulting microspheres will generally be impermeable to ambient gases. The shells formed with this method may be filled with a variety of gases and pressurized from near vacuums to above atmosphere. This is a suitable method for producing microspheres. U.S. Patent Application Publication 2002/0004111 (Matsubara et al.), incorporated herein by reference discloses a method of preparing hollow glass microspheres by adding a combustible liquid (kerosene) to a material containing a foaming agent. Methods for forming microspheres are also disclosed in U.S. Pat. Nos. 3,848,248 (MacIntyre), 3,998,618 (Kreick et al.), and 4,035,690 (Roeber), discussed above and incorporated herein by reference. Methods of manufacturing hollow microspheres are disclosed in U.S. Pat. Nos. 3,794,503 (Netting), 3,796,777 (Netting), 3,888,957 (Netting), and 4,340,642 (Netting et al.), all incorporated herein by reference. Other prior art methods for forming microspheres are disclosed in the prior art including U.S. Pat. Nos. 3,528,809 (Farnand et al.), 3,975,194 (Farnand et al.), 4,025,689 (Kobayashi et al.), 4,211,738 (Genis), 4,307,051 (Sargeant et al.), 4,569,821 (Duperray et al.), 4,775,598 (Jaeckel), and 4,917,857 (Jaeckel et al.), all of which are incorporated herein by reference. These references disclose a number of methods which comprise an organic core such as naphthalene or a polymeric core such as foamed polystyrene which is coated with an inorganic material such as aluminum oxide, magnesium, refractory, carbon powder, or the like. The core is removed such as by pyrolysis, sublimation, or decomposition and the inorganic coating sintered at an elevated temperature to form a sphere or microsphere. Farnand et al. '809 discloses the production of hollow metal spheres by coating a core material such as naphthalene or anthracene with metal flakes such as aluminum or magnesium. The organic core is sublimed at room temperature over 24 to 48 hours. The aluminum or magnesium is then heated to an elevated temperature in oxygen to form aluminum or magnesium oxide. The core may also be coated with a metal oxide such as aluminum oxide and reduced to metal. The resulting hollow spheres are used for thermal insulation, plastic filler, and bulking of liquids such as hydrocarbons.

Farnand '194 discloses a similar process comprising polymers dissolved in naphthalene including polyethylene and polystyrene. The core is sublimed or evaporated to form hollow spheres or microballoons. Kobayashi et al. '689 discloses the coating of a core of polystyrene with carbon powder. The core is heated and decomposed and the carbon powder heated in argon at 3000° C. to obtain hollow porous graphitized spheres. Genis '738 discloses the making of lightweight aggregate using a nucleus of expanded polystyrene pellet with outer layers of sand and cement. Sargeant et al. '051 discloses the making of light weight-refractories by wet spraying core particles of polystyrene with an aqueous refractory coating such as clay with alumina, magnesia, and/or other oxides. The core particles are subject to a tumbling action during the wet spraying and fired at 1730° C. to form porous refractory. Duperray et al. '821 discloses the making of a porous metal body by suspending metal powder in an organic foam which is heated to pyrolyze the organic and sinter the metal. Jaeckel '598 and Jaeckel et al. '857 disclose the coating of a polymer core particle such as foamed polystyrene with metals or inorganic materials followed by pyrolysis on the polymer and sintering of the inorganic materials to form the sphere. Both disclose the formation of metal spheres such as copper or nickel spheres which may be coated with an oxide such as aluminum oxide. Jaeckel et al. '857 further discloses a fluid bed process to coat the core.

Substrate

This invention is described herein with reference to a plasma-shell mounted on a single substrate. However, an opposing or dual substrate configuration may be used. The plasma-shell PDP may consist of a single substrate made of flexible or rigid materials. Semi-flexible or partly flexible materials may also be used. The substrate surface may be flat, curved, or irregular. The substrate may be opaque or transparent. In some embodiments, a substrate may comprise two or more layers. The flexible or bendable substrate may be made from a polymeric film or like material. The flexible substrate may also be made of metallic materials alone or incorporated into a polymeric substrate. The two-electrode plasma-shell configuration on a single substrate is shown in FIG. 1A.

Flexible Displays

The following references relate to flexible displays, and are incorporated herein by reference: Y. M. Li, "High Frequency Driving of Address Electrode for AC Plasma Display to Enhance the Luminance and Luminous Efficiency" Society for Information Display 2002 International Symposium Digest of Technical Papers, Volume XXXIII, Book I, pp. 436-439 and R. C Lang, Jack Hou, Jerru Chung, Xiaojia Wang, Cheri Pereira, and Chen Yajuan, SiPix Imaging "Microcup Active and Passive Matrix Electrophoretic Displays by Roll to Roll Manufacturing Processes", Society for Information Display 2003 International Symposium Digest of Technical Papers, Volume XXXIV, Book II, pp. 838-841.

SUMMARY

The plasma-shell is an enclosed pixel structure. Each plasma-shell is physically and electrically isolated from its neighbors. The ionizable gas encapsulated inside the plasma-shell is isolated from the gas inside the neighbor pixels. This enclosed pixel structure is an important factor in the operating window of the plasma-shell array. The plasma-shell is immune to charge spreading. Charge spreading occurs in open cell plasma displays when a pixel is overly energized and the ionized plasma from that pixel causes neighbor pixels to light. The enclosed encapsulating plasma-shell pixel structure also leads to higher ON voltages. This leads to higher memory margins and the ability to use a higher voltage sustain pulse that increases the light output of the plasma-shell. The plasma-shell array also has increased brightness and efficacy.

Plasma-shell displays are made with a low cost, high yield manufacturing process and have unique characteristics that make them useful for a number of display applications especially those requiring large size displays and/or high frame rate and gray scale. This is a highly viable display with increased brightness and efficacy. The high brightness of these displays makes them desirable for multi viewer applications, such as dynamic signage, stadium displays, simulators, games, and entertainment. By using a flexible substrate, the plasma-shell display may be bent or flexed in any direction.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. In an AC or DC gas discharge plasma display panel, the improvement wherein the display comprises a multiplicity of gas filled plasma-shells, each plasma-shell containing a fluorescent conversion material which produces IR photons during gas discharge, said material being a rare earth doped chalcogenide.

2. The invention of claim 1 wherein the plasma-shells are mounted on or in a single substrate.

3. The invention of claim 2 wherein the substrate is flexible or partly flexible.

4. The invention of claim 1 wherein each plasma-shell is a plasma-sphere, plasma-disc, or plasma-dome.

5. In a gas discharge plasma display panel, the improvement wherein the display panel comprises a multiplicity of ionizable gas filled plasma-shells located on a substrate, each plasma-shell containing a fluorescent conversion material that emits IR when the fluorescent conversion material is excited by photons from a gas discharge within a plasma-shell, said material being a rare earth doped chalcogenide.

6. The invention of claim 5 wherein the plasma-shells are mounted on or in a single substrate.

7. The invention of claim 6 wherein the substrate is flexible or partly flexible.

8. The invention of claim 5 wherein each plasma-shell is a plasma-sphere, plasma-disc, or plasma-dome.

* * * * *